(12) United States Patent
Ricard et al.

(10) Patent No.: US 7,310,579 B2
(45) Date of Patent: Dec. 18, 2007

(54) METHOD FOR GENERATING A RESERVOIR MODEL ON FLEXIBLE GRID

(75) Inventors: Ludovic Ricard, Rueil Malmaison (FR); Mickaële Le Ravalec-Dupin, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 139 days.

(21) Appl. No.: 11/220,585

(22) Filed: Sep. 8, 2005

(65) Prior Publication Data

US 2006/0058965 A1 Mar. 16, 2006

(30) Foreign Application Priority Data

Sep. 16, 2004 (FR) .................................. 04 09824

(51) Int. Cl.
*G01V 3/00* (2006.01)
*G01V 1/00* (2006.01)

(52) U.S. Cl. ........................................... 702/2; 367/73
(58) Field of Classification Search ................. 702/2, 702/5, 11–14, 17; 703/10; 382/109; 367/73
See application file for complete search history.

(56) References Cited

U.S. PATENT DOCUMENTS

| | | | | |
|---|---|---|---|---|
| 5,764,515 A | * | 6/1998 | Guerillot et al. ................. | 702/2 |
| 5,844,799 A | * | 12/1998 | Joseph et al. .................... | 702/2 |
| 6,018,497 A | * | 1/2000 | Gunasekera ..................... | 367/72 |
| 6,078,869 A | * | 6/2000 | Gunasekera ..................... | 702/6 |
| 6,662,109 B2 | * | 12/2003 | Roggero et al. ................. | 702/6 |
| 6,826,483 B1 | * | 11/2004 | Anderson et al. ............... | 702/13 |
| 6,928,399 B1 | * | 8/2005 | Watts et al. ..................... | 702/13 |
| 7,006,959 B1 | * | 2/2006 | Huh et al. ....................... | 703/10 |
| 7,043,367 B2 | * | 5/2006 | Granjeon ......................... | 702/2 |
| 2003/0028325 A1 | | 2/2003 | Roggero et al. | |

OTHER PUBLICATIONS

Le Ravalec et al., The FFT Moving Average (FFT-MA) Generator: An Efficient Numerical Method for Generating and Conditioning Gaussian Simulations, 2000, Mathematical Geology, vol. 32, No. 6, pp. 701-723.*
Tran T T et al. "Efficient conditioning of 3D fine-scale reservoir model to multiphase production data using streamline-based coarse-scale inversion and geostatistical downscaling" pp. 1-13, Oct. 3-6, 1999.
Durlofsky L. et al. "Scale up of heterogeneous three dimensional reservoir descriptions" pp. 313-326, Sep. 1996.

* cited by examiner

*Primary Examiner*—Bryan Bui
*Assistant Examiner*—Toan M. Le
(74) *Attorney, Agent, or Firm*—Antonelli, Terry, Stout & Kraus, LLP.

(57) ABSTRACT

A method having application notably to the development of petroleum reservoirs for fast generation of a geostatistical reservoir model on flexible grid, representative of a porous heterogeneous medium. A flexible grid best discretizing the medium is first generated. A regular Cartesian grid whose cell size, in a given direction, is greater than or equal to the largest size of the cell of the flexible grid in the same direction is then generated. On this Cartesian grid, at least one realization of petrophysical quantities characteristic of the heterogeneous medium is simulated from a geostatistical simulator. Then, this realization is resampled with a smaller discretization interval in order to know the petrophysical value associated with the realization at any point of the medium. Finally, the values of the simulated petrophysical properties are assigned to the center of the cells of the flexible grid.

10 Claims, 3 Drawing Sheets

METHOD FOR GENERATING A RESERVOIR MODEL ON FLEXIBLE GRID

BACKGROUND OF THE INVENTION

1. Field of the Invention

The present invention relates to a method for fast generation of a geostatistical reservoir model on a flexible grid, representative of a porous heterogeneous medium.

2. Description of the Prior Art

Optimization of the development of petroleum reservoirs requires a precise survey of the subsoil. It is therefore necessary to generate a reservoir model compatible, as much as possible, with all of the data collected (logs, seismic data, outcrop data, production records, . . . ) and to estimate, by reservoir simulation, the production of this constrained reservoir. The goal is to reduce the uncertainty on the production predictions insofar as a reservoir model compatible with all of the data is available. Since the data collected are insufficient for deterministic construction of a reservoir model, stochastic modelling techniques, most often based on geostatistical techniques, are used, which provide a family of numerical stochastic models of the reservoir. Prior to reservoir simulation, a reservoir characterization in terms of geometry and petrophysical properties is carried out in form of numerical stochastic reservoir models. A numerical model consists of an N-dimension grid (N>0 and generally equals two or three) each cell of which is assigned the value of a petrophysical property characteristic of the studied zone. It can be, for example, the porosity or the permeability distributed in a reservoir. What is referred to as the map of a petrophysical property is all of the values of the petrophysical property expressed in each one of the cells of the grid. Thus, sampling of a map follows gridding of the numerical model. A numerical reservoir model is the combination of a grid and of petrophysical property maps of the reservoir. In a stochastic context, the term realization of a petrophysical property will be used rather than the term map. There is an infinity of possible realizations compatible with one geologic description of the medium.

Two main families can be clearly distinguished from among all the data required for characterization of a reservoir: the data referred to as static, which include 3D seismic data, outcrop and log data, and the dynamic data which comprise production records and 4D seismic data. The dynamic data are distinguished in that they vary with time according to fluid flows. Integration of these two data families within the numerical model is not performed identically. Integration of the static data is carried out upon generation of the geologic model, whereas integration of the dynamic data is carried out via an inversion problem and requires many flow simulations.

The procedure for conditioning the numerical models to the production data requires frequent use of simulators. The numerical model therefore has to comprise few cells in order to obtain short calculating times. However, flow simulations on the numerical model have to be very precise in the neighborhood of singular objects such as faults, clay banks or wells for example. The grids therefore have to be very precise for these zones.

The method allowing generation of a numerical geostatistical model representative of a porous heterogeneous medium therefore has to meet several requirements:

1. The method must allow, if necessary, integration of static well data;
2. The method must allow, if necessary, integration of dynamic production data;
3. The method must limit errors on flow simulations in the neighborhood of singular objects.

1. Static Data Integration

It is sometimes necessary to constrain the simulations by static data such as well data. Conditioning by static data consists in constraining realization Y by values Vi at points Pi. There are many techniques for estimating locally the geostatistical parameters at points Pi. Kriging techniques such as simple kriging, ordinary kriging or universal kriging can be mentioned for example.

2. Dynamic Production Data Integration

An inverse problem has to be solved and a cost function therefore has to be minimized to integrate the dynamic production data in the model. Such a technique is for example described in the following document:

Tarantola, A., 1987, *"Inverse Problem Theory—Methods for Data Fitting and Model Parameter Estimation"*, Elsevier, Amsterdam, p. 613.

However, these techniques generally involve an objective function defined by a large number of parameters. On the other hand, a parameterization method allows fast integration of the dynamic data on the basis of a cost function described by a small number of parameters. It is the gradual deformation technique described, for example, in French patent 2,780,798 filed by the assignee.

It should be noted that this method is a parameterization technique allowing deformation of a realization from a reduced number of parameters while keeping the geostatistical structure thereof. Owing to these properties, this parameterization technique is of great interest for constraining a reservoir model by dynamic production data. It has in fact been introduced in the case history calibration process intended for construction of a reservoir model constrained by the production data. With this gradual deformation technique, it is possible to modify both globally and locally the geostatistical realizations. In the case of local modifications, knowledge of the underlying Gaussian white noise is necessary.

3. Limitation of the Error on Flow Simulations in the Neighborhood of Singular Objects In order to limit the error of the results of flow simulations due to the grid, the petroleum industry turned to the use of flexible grids. A flexible grid is a grid containing cells of different shapes and different volumes. This type of grid is for example described in the following document:

Balaven-Clermidy, S., 2001, *"Génération de Maillages Hybrides pour la Simulation des Réservoirs Pétroliers"*, PhD thesis, Ecole des Mines de Paris.

This type of grid allows improvement of the description of the numerical model by fining down the flow model in the most flow-sensitive zones (wells, faults, high-heterogeneity zones, . . . ).

The local or global gradual deformation technique is thus clearly the most efficient technique for integrating dynamic data. Besides, in order to limit information loss upon creation of the grid used for flow simulations, it is necessary to use flexible grids. However, all geostatistical simulation methods are not fully compatible with the gradual deformation method. For example, realizations simulated from the turning band method cannot be subjected to a local gradual deformation because geostatistical turning band type simulators do not separate the Gaussian white noise generation from the covariance structure. As for the methods based on a Cholesky decomposition of the covariance matrix, computer processing cannot be considered for a number of points above 1000. Now, the size of a geostatistical model is generally of the order of one million grid cells. These methods can therefore not be considered for an oil reservoir survey. Sequential simulation algorithms can be adapted to the gradual deformation method although they require some adjustments concerning the definition of the path for visiting the points where a value is to be simulated. This technique is for example described in the following document:

Hu, L. Y., Blanc G. and Noetinger B., 2001; *"Gradual Deformation and Iterative Calibration of Sequential Stochastic Simulations"*, Math. Geol., 33(4).

However, the drawback of this method is that the simulations at the N-th point involve their conditioning by the previously simulated N–1 values: the algorithm can rapidly become costly even when using moving neighborhood techniques. Another drawback is that it implies cells of substantially equivalent size.

The FFT-MA method is naturally integrated in the context of gradual deformation. It is described in:

Le Ravalec, M., Noetinger, B. And Hu, L.-Y., 2000, *"The FFT-Moving Average (FFT-MA)Generator: An Efficient Tool for Generating and Conditioning Gaussian Simulations"*, Math. Geol., 32(6), 701-723.

This method produces realizations which can be deformed globally or locally according to the gradual deformation principles. This property is linked with the convolution product which uncouples the random numbers (that is the Gaussian white noise) from the geostatistical parameters (that is the core of the covariance function). The random numbers can then be varied either in their entirety, or by zone, and global or local deformations can be induced while keeping the covariance model. However, this technique cannot be used on flexible grids by construction. In fact, it is based on the use of fast Fourier transforms, which are particularly efficient tools in the case of Cartesian grids.

SUMMARY OF THE INVENTION

The invention relates to a method for generating a numerical stochastic model representing the spatial distribution of at least one petrophysical property characteristic of a porous heterogeneous medium. The method comprises the following stages:

discretizing in space the heterogeneous medium by means of a flexible grid;

generating a regular Cartesian grid whose cell size in a given direction is greater than or equal to the largest size of the cell of the flexible grid in the same direction;

simulating, by means of a geostatistical simulator, at least one realization of the petrophysical property on the regular Cartesian grid, from at least one random number;

resampling the realization with an interval whose size is less than or equal to the smallest cell size of said flexible grid; and constructing a geostatistical realization of a reservoir model on the flexible grid, by assigning to the center of the cells of the flexible grid values of the resampled realization that are as close as possible to this center.

In particular, the method according to the invention applies to the construction of a numerical stochastic model for representing the spatial distribution, in an underground zone, of continuous or discrete petrophysical properties, such as the permeability, the lithology type or the porosity. It is designed to give engineers means for estimating precisely the reserves of a petroleum reservoir and for optimizing recovery of these reserves by studying various production schemes.

The method according to the invention allows fast generation of a geostatistical reservoir model on a flexible grid, which can be constrained by the static well data and the dynamic production data. It can be compatible with the gradual deformation method.

According to the invention, the geostatistical simulator can be selected from among the simulators compatible with the gradual deformation technique. A geostatistical simulator based on the Fast Fourier Transform Moving Average (FFT-MA) method can for example be selected.

According to the invention, the calculating time can be reduced by using the spectral domain during the stage of resampling the realization.

Finally, the random number can result from a reconstruction of a realization, continuous or discrete, resulting from a random function representing a numerical model, using for example a method such as the method described in French patent application 04/04,492 filed by the assignee.

BRIEF DESCRIPTION OF THE DRAWINGS

Other features and advantages of the method according to the invention will be clear from reading the description hereafter of non limitative embodiment examples, with reference to the accompanying figures wherein.

DETAILED DESCRIPTION OF THE INVENTION

Figure 1:
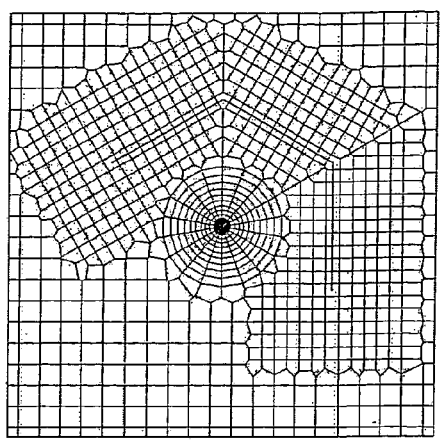
FIG. 1 illustrates a two-dimensional flexible grid.

The method, according to the invention, allows generation of a geostatistical reservoir model on a flexible grid, which can be constrained by static well data and dynamic production data, and it can be compatible with the gradual deformation method.

The geostatistical simulation method on flexible grid can be split up into five main stages:

1. Generating a flexible grid;
2. Generating a regular Cartesian grid whose cell size in a given direction is greater than or equal to the largest size of the cell of the flexible grid in the same direction,
3. On this Cartesian grid, simulating at least one realization of petrophysical properties characteristic of the heterogeneous medium, that is to be generated in the geostatistical model on flexible grid, from a geostatistical simulator based on at least one random number;
4. Resampling the realization with a smaller discretization interval in order to know the petrophysical value associated with the realization at any point of the medium;
5. Assigning the simulated petrophysical property values to the center of the cells of the flexible grid.

These five stages are described in detail hereafter.

Generation of a Flexible Grid

The generation of a flexible grid is well-known in the art. Such a grid is for example described in the aforementioned document by S. Balaven-Clermidy (2001).

It is possible for example to generate a radial grid around vertical wells, an orthogonal fine grid around horizontal wells and a regular Cartesian grid far from the wells.

Within the scope of the present invention, this grid can also be supplied as input data.

Generation of a Regular Cartesian Grid

A regular Cartesian grid whose cell size in a given direction is greater than or equal to the largest cell size of the flexible grid in the same direction is generated in this stage. Generation of a regular Cartesian grid is a conventional operation to those skilled in the art. It discretizes the medium in parallelepipedic regular cells. Such a grid is also described, for example, in the aforementioned document by S. Balaven-Clermidy (2001).

Within the scope of the present invention, this grid can also be supplied as input data.

Geostatistical Simulation on the Regular Cartesian Grid

In this stage, a realization of at least one petrophysical quantity (permeability for example) characteristic of the heterogeneous medium is simulated on the regular Cartesian grid from a geostatistical simulator. Many geostatistical simulators are known to those skilled in the art for simulating petrophysical quantity realizations and all can be used within the scope of the method. The aforementioned techniques can for example be mentioned: the Cholesky decomposition method, the sequential simulation methods, the turning band method and the FFT-MA method. All these simulators are based on at least one random number: germ, Gaussian white noise, . . .

Static Data Integration

It is sometimes necessary to constrain the simulations by static data such as well data. Conditioning by static data constrains realization Y by values Vi at points Pi. There are many methods for estimating locally, at points Pi, the geostatistical parameters. The conditional kriging technique, also referred to as double kriging (Matheron, 1967), can be used for example. It requires a simple kriging type interpolation of data Vi on all of the medium. This interpolation is denoted by Ydk. An evaluation of geostatistical simulation Y at conditioning points Pi is then carried out yielding $\tilde{V}i=Y(Pi)$. A simple kriging type interpolation is then performed from these values $\tilde{V}i$ and this interpolation is denoted by Yk.

The conditioned geostatistical simulation is obtained by linear combinations of these interpolations Ydk and Yk and of realization Y:

$$Yc=Ydk+(Y-Yk).$$

Dynamic Production Data Integration

The aforementioned simulation techniques can be used within the scope of the method according to the invention to integrate dynamic production data. However, to generate geostatistical models compatible with the gradual deformation technique, there are currently only two families of methods: the FFT-MA method and the sequential simulation methods. Unlike the sequential simulation methods, the FFT-MA method is not applicable on flexible grids. This is due to the use of fast Fourier transforms. There is currently one geostatistical simulation method on flexible grid compatible with the dynamic production data integration by means of the gradual deformation parameterization technique. However, this method using a kriging type estimator becomes relatively costly in calculating time for relatively large media. Another drawback thereof is that it implies cells of substantially equivalent size.

The FFT-MA method is thus used in the method according to the invention, in cases where compatibility with the gradual deformation parameterization technique is sought. In fact, this method is fast because it benefits by the use of fast Fourier transforms. Besides, this method is naturally integrated in an optimization procedure and it is fully compatible with the gradual deformation method. The latter property is linked with the fact that, for the FFT-MA method, the Gaussian white noise is generated in the real domain and not in the spectral domain. A component of the Gaussian white noise is thus assigned to each reservoir cell. Using the FFT-MA simulator in the procedure for generating the reservoir model on flexible grid therefore allows application of the global and local gradual deformation technique. Thus, this method is compatible with conditioning by the static well data and the dynamic production data.

The FFT-MA method is based on a moving average method coupled with processing of the convolution operator in the spectral domain.

The moving average method involves working with the covariance function rather than with the covariance matrix. This covariance function C can be split up into a convolution product of two functions g and $\tilde{g}$, with $\tilde{g}$ transposed from g( $\tilde{g}(x)=g(-x)$):

$$C=g*\tilde{g}$$

A multi-Gaussian field y of average m and of covariance function C is generated from the relation:

$$y=m+g*z$$

where z is a Gaussian white noise.

This stage thus allows obtaining a first realization of a reservoir model on a regular Cartesian grid from a geostatistical simulator (FFT-MA for example). This realization provides a realization representative of the values of a petrophysical variable, sampled with the regular interval of the grid.

According to the method, any geostatistical simulator can be used for geostatistical simulation on the regular Cartesian grid. However, in a particular embodiment of the invention, when seeking a compatibility with the gradual deformation parameterization technique in order to efficiently integrate the dynamic production data, the FFT-MA simulator is used.

Within the scope of the method according to the invention, this simulation can also be provided as input data. If a compatibility with the gradual deformation parameterization technique is necessary, it is possible for example to determine the white noise of the simulation and to carry out a new realization by means of the FFT-MA simulator, as described in the assignee's French patent application 04/04,492.

Reconstruction Principle

The method according to the invention is based on reconstruction of a realization already sampled on a regular Cartesian grid. What is understood to be reconstruction is resampling of this realization on a regular Cartesian grid whose discretization interval is smaller than the previous one. This resampling allows adapting a realization discretized on a first regular Cartesian grid of constant interval DX (three-component vector corresponding to the discretization intervals in the three spatial directions) to a Cartesian grid of constant interval dx (three-component vector corresponding to the discretization intervals in the three spatial directions) that can be smaller than the interval of the first grid. This technique is based on a theorem resulting from the signal processing and it allows, from an existing realization on Cartesian grid of constant interval, to know the value of the petrophysical property associated with this realization, at any point of the medium. In fact, during this stage, the realization is resampled with another discretization interval and, by causing this interval to tend towards zero, it is possible to know the value of the petrophysical property at any point.

Using the spectral domain for this realization resampling stage allows the calculating time to be reduced. This stage is well-known to those skilled in the art. Such a method is for example described in the following document:

Mari, J. L., Glangeaud, F. and Coppens, 1997, *"Traitement du Signal Pour Géologues et Géophysiciens"*, Editions Technip, Paris.

In the particular case when considering a one-dimensional realization of N values arranged on a regular Cartesian grid of interval DX that is to be resampled on a grid comprising M×N cells arranged on a regular Cartesian grid of interval dx, the procedure to be followed can be split up as follows:

calculating the Fourier spectrum of the original realization y[i] at N frequencies. Two vectors are obtained of dimension N (one for the real part of the Fourier transform, the other for the imaginary part);

separating in this spectrum the positive frequencies from the negative frequencies for each of these two vectors. There are, by definition of a Fourier transform, N/2 positive frequencies and N/2 negative frequencies;

for each vector, adding as many zero-amplitude frequencies as spectrum components are missing to have a vector of M×N components. Therefore the (M−1)×N/2 components are added to the positive frequencies part and (M−1)×N/2 components to the positive frequencies part; and calculating the inverse Fourier transform of this vector. A vector is obtained with M×N components. It is the reconstructed realization (ỹ[i]) with an interval dx=DX/M.

Assigning Values to the Center of the Flexible Cells

It is now desirable to calculate, for each cell of the flexible grid, the coordinates of its center. The coordinates of the point of the reconstructed realization are then calculated that is the closest to this center. Finally, the value of the reconstructed realization available is assigned to these coordinates at the center of the cell of the flexible grid. This method is independent of the way the flexible grid is generated and of the shape thereof. Furthermore, this allows generation of continuous realizations as well as facies realizations via the truncated Gaussian method.

APPLICATION EXAMPLES

Application to a Continuous Realization

It is desired to generate a two-dimensional reservoir model by simulating a permeability field from wells. To obtain a better resolution, a flexible grid is first generated to discretize the medium to be modelled (reservoir). In order to better take account of a vertical well at the center of a realization and three horizontal wells surrounding this vertical well (these wells are diagrammatically shown by a thick line in FIG. 1), a radial grid is generated around the vertical well and a fine orthogonal grid is generated around the horizontal wells. Finally, a regular Cartesian grid is generated far from the wells. The grid thus generated has 929 cells.

It is desired to perform a geostatistical simulation on this flexible grid (illustrated in FIG. 1) by means of the method according to the invention.

Figure 2:
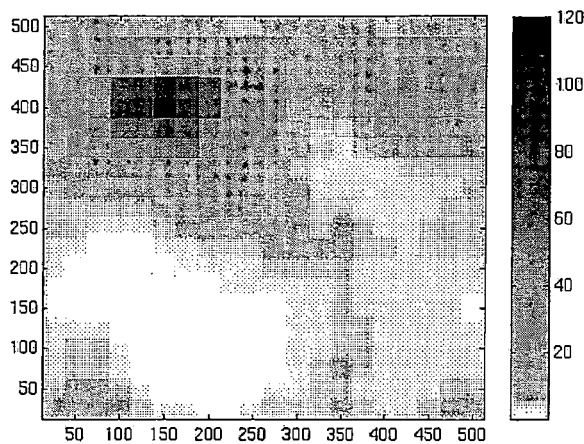
FIG. 2 shows a realization resulting from a geostatistical simulation on a regular Cartesian grid.

A geostatistical simulation is then performed on a regular Cartesian grid (FIG. 2) on a 20×20 grid, i.e. 400 cells. The size of the Cartesian cell corresponds to the size of the largest and most frequent flexible cell. This simulation is carried out by means of the FFT-MA simulator. The variographic data and the distribution of the simulated petrophysical variable (permeability) have the following characteristics in the realization shown in FIG. 2:

variogram: isotropic Gaussian correlation length: ⅕ of the size of the medium, i.e. 4 cells for the Cartesian realization field ln(K) average: 1.5 field ln(K) variance: 1.

Figure 3:
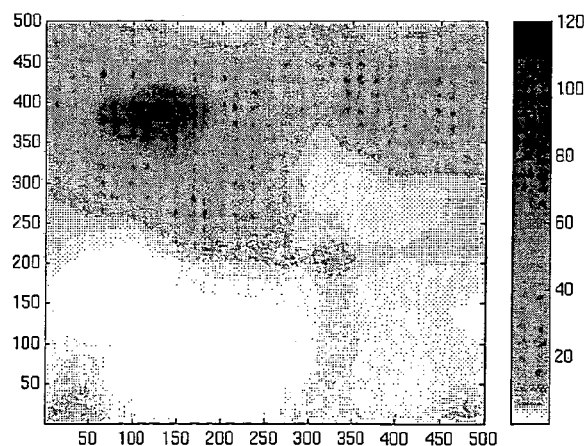
FIG. 3 illustrates a realization resampled on a finer grid.

The realization is then resampled by selecting the value of the interval of the reconstructed realization; here, a reconstruction interval is selected that is 10 times as small as the initial interval. The reconstructed realization is shown in FIG. 3.

Figure 4:
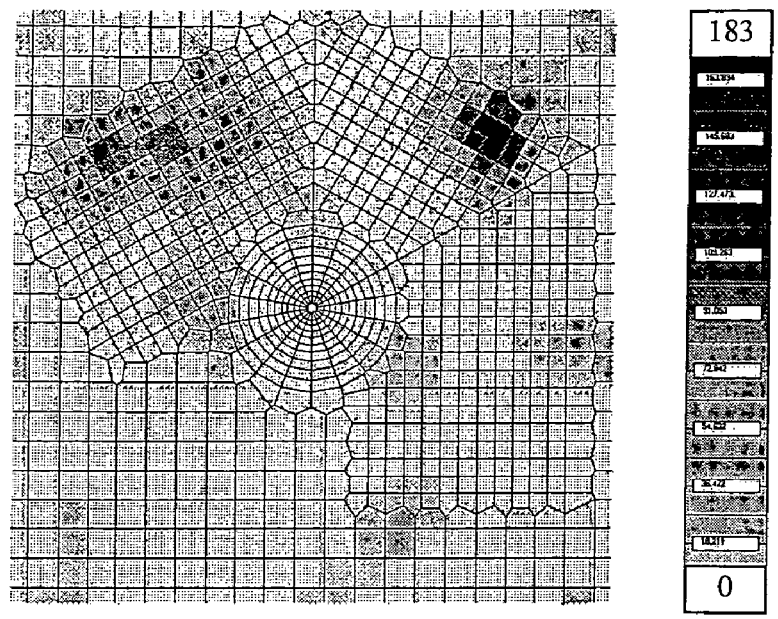
FIG. 4 shows a continuous realization on the flexible grid of FIG. 1, obtained by means of the method according to the invention.

Finally, the reconstructed realization is matched with the flexible grid. Eventually a geostatistical realization on flexible grid is obtained, as illustrated by FIG. 4.

Application to a Facies Realization

Simulation methods produce, from a germ or, in an equivalent way, from a Gaussian white noise, realizations. There are two types of realization: continuous realizations and discrete realizations. Typically, a continuous realization can describe the spatial distribution of an attribute such as permeability. The permeability values evolve continuously from one point in space to the next. In parallel, a discrete realization can describe the spatial distribution of facies. The various facies are identified by an indicator: for example, 1 for the reservoir facies (F1) and 2 for the non-reservoir facies (F2). When going from the reservoir facies to the non-reservoir facies, a discontinuity exists: the going is from 1 to 2.

A facies realization is generated using for example the truncated Gaussian method, described for example in the following document:

Matheron, G., 1967, *"Eléments Pour Une Théorie Des Milieux Poreux"*, Masson, Paris.

Figure 5:
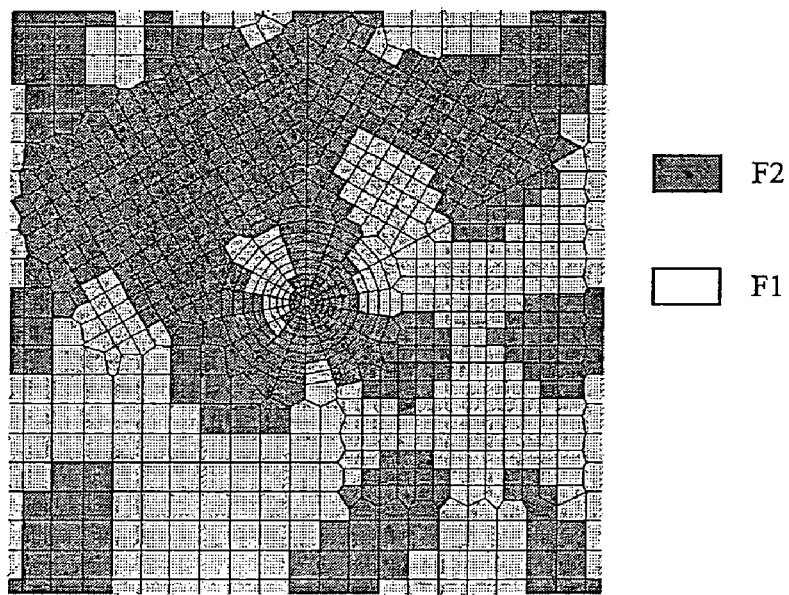
FIG. 5 shows a facies realization on the flexible grid of FIG. 1, obtained by means of the method according to the invention.
Figure 6A:
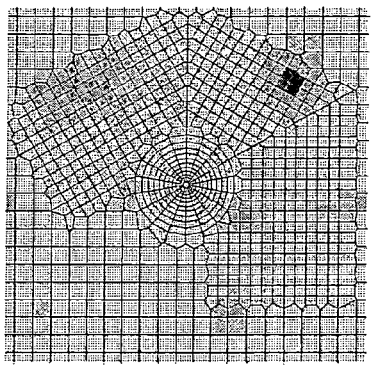
FIGS. 6A to 6F illustrate the application of local gradual deformations to a continuous realization on a flexible grid obtained by means of the method according to the invention.
Figure 6B:
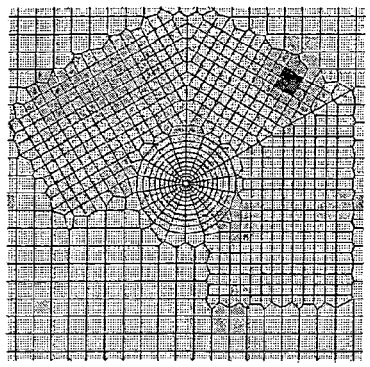
Figure 6C:
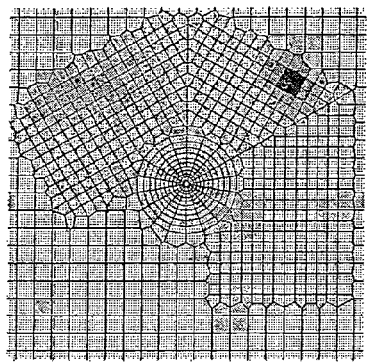
Figure 6D:
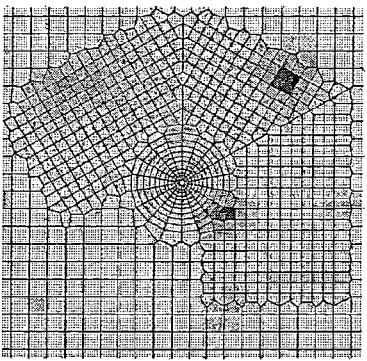
Figure 6E:
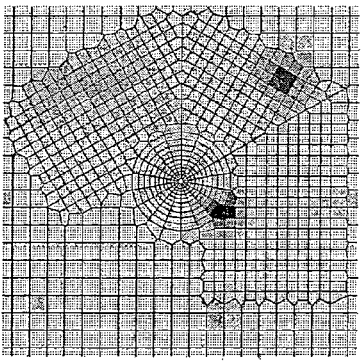
Figure 6F:
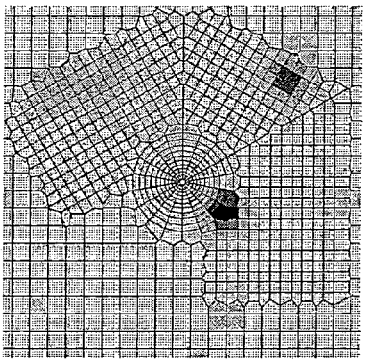

First a standard normal realization is generated respecting a fixed covariance model. The resampling method of the invention is then applied. It is only after this stage that the truncated Gaussian method is applied to construct the facies realization on the flexible grid (FIG. 1). The final realization is shown in FIG. 5.

Application of Gradual Deformations to Flexible Grids

The interest of this geostatistical simulation method on flexible grid is that it is compatible with parameterization by means of the gradual deformation method. This property is illustrated in the following example, for global gradual deformations as well as local deformations. It can first be reminded that the method according to the invention can use the geostatistical FFT-MA simulator, which itself is compatible with gradual deformations. The gradual deformation method is used with the white noises of the geostatistical simulations, which allows producing global and local deformations. Installation of the gradual deformation method is thus performed upstream from the geostatistical simulation algorithm. Deformation examples are shown in FIGS. 6A to 6F. The continuity of the local deformation process is checked.

The invention claimed is:

1. A method for optimizing development of a petroleum reservoir by studying production schemes by generating a numerical stochastic model representing a spatial distribution of at least one petrophysical property characteristic of a porous heterogeneous medium, comprising:

discretizing in space the petroleum reservoir by means of a flexible grid;

generating a regular Cartesian grid having a cell size in a given direction which is greater than or equal to a largest size of a cell of the flexible grid in the given direction;

simulating, by means of a geostatistical simulator, at least one realization of the at least one petrophysical property on the regular Cartesian grid, from at least one random number;

resampling the at least one realization with an interval having a size which is less than or equal to a smallest cell size of the flexible grid;

constructing a geostatistical realization of a reservoir model on the flexible grid, by assigning to a center of the cells of the flexible grid values of the resampled at least realization that are as close as possible to the center; and estimating production of the petroleum reservoir for one of the production schemes using the reservoir model.

2. A method as claimed in claim 1, wherein the geostatistical simulator is compatible with a gradual deformation technique.

3. A method as claimed in claim 2, wherein the geostatistical simulator is based on a Fast Fourier Transform Moving Average (FFT-MA) method.

4. A method as claimed in claim 3, wherein the at least one random number results from a reconstruction of the at least one realization, continuous or discrete, resulting from a random function representing a numerical model.

5. A method as claimed in claim 2, wherein the at least one random number results from a reconstruction of the at least one realization, continuous or discrete, resulting from a random function representing a numerical model.

6. A method as claimed in claim 1, wherein the geostatistical simulator is based on a Fast Fourier Transform Moving Average (FFT-MA) method.

7. A method as claimed in claim 6, wherein the at least one random number results from a reconstruction of the at least one realization, continuous or discrete, resulting from a random function representing a numerical model.

8. A method as claimed in claim 1, wherein a spectral domain is used when resampling the at least one realization.

9. A method as claimed in claim 8, wherein the at least one random number results from a reconstruction of the at least one realization, continuous or discrete, resulting from a random function representing a numerical model.

10. A method as claimed in claim 1, wherein the at least one random number results from a reconstruction of the at least one realization, continuous or discrete, resulting from a random function representing a numerical model.

* * * * *